(12) United States Patent
Pai

(10) Patent No.: US 8,480,017 B2
(45) Date of Patent: Jul. 9, 2013

(54) GRINDER AND AUTOMATIC OPEN/CLOSE CONTROL DEVICE THEREOF

(76) Inventor: Chung-Jen Pai, New Taipei (TW)

( * ) Notice: Subject to any disclaimer, the term of this patent is extended or adjusted under 35 U.S.C. 154(b) by 0 days.

(21) Appl. No.: 13/557,345

(22) Filed: Jul. 25, 2012

(65) Prior Publication Data
US 2013/0026269 A1    Jan. 31, 2013

(30) Foreign Application Priority Data

Jul. 27, 2011 (TW) .............................. 100126525 A

(51) Int. Cl.
*A47J 42/00* (2006.01)
*B02C 7/04* (2006.01)

(52) U.S. Cl.
USPC ..................................... 241/169.1; 241/261.1

(58) Field of Classification Search
USPC .......................... 241/168, 168.1, 261.1, 101.2
See application file for complete search history.

(56) References Cited

U.S. PATENT DOCUMENTS

| | | | | |
|---|---|---|---|---|
| 5,785,264 A * | 7/1998 | Yang | ........................... | 241/169.1 |
| 5,865,384 A * | 2/1999 | Pai | ................................... | 241/93 |
| 6,929,201 B1 * | 8/2005 | Blouse et al. | .............. | 241/169.1 |
| 7,207,511 B2 * | 4/2007 | Ng | .............................. | 241/101.3 |
| 7,604,191 B2 * | 10/2009 | Pai | .............................. | 241/169.1 |
| 7,793,874 B2 * | 9/2010 | Pai | ................................. | 241/168 |
| 2002/0117566 A1 * | 8/2002 | Cheng | ......................... | 241/169.1 |
| 2004/0124294 A1 * | 7/2004 | Ng | .............................. | 241/169.1 |
| 2004/0182958 A1 * | 9/2004 | Herren | ....................... | 241/169.1 |
| 2005/0029376 A1 * | 2/2005 | Heng et al. | ................. | 241/169.1 |
| 2005/0211806 A1 * | 9/2005 | Ng | .............................. | 241/169.1 |
| 2007/0210195 A1 * | 9/2007 | Chapman et al. | .......... | 241/169.1 |
| 2008/0093489 A1 * | 4/2008 | Hadj-Chikh et al. | ...... | 241/169.1 |
| 2009/0084878 A1 * | 4/2009 | Wang Wu | .................. | 241/169.1 |

* cited by examiner

*Primary Examiner* — Faye Francis
(74) *Attorney, Agent, or Firm* — Guice Patents PLLC

(57) ABSTRACT

The present invention relates to a grinder, comprising a grinding unit is installed between a receptacle and a base. A grinding wheel and a grinding base of the grinding unit are detachably and respectively installed on a transmission shaft and at the bottom side of the receptacle, and a bottom cover of an automatic open/close control device utilizes an engaging button for being combined with a combination part of a fasten cover installed at the bottom side of a follower member, so the bottom cover can be detachably installed at the bottom opening of a housing. Accordingly, components which may have food powders adhered thereon, such as the grinding wheel and the grinding base of the grinding unit and the follower member, the housing and the bottom cover of the automatic open/close control device are capable of being detached for cleaning, so the food hygiene can be ensured.

12 Claims, 6 Drawing Sheets

GRINDER AND AUTOMATIC OPEN/CLOSE CONTROL DEVICE THEREOF

BACKGROUND OF THE INVENTION

1. Field of the Invention

The present invention relates to a grinder, especially to a grinder capable of being detached for cleaning and having an automatic open/close control device.

2. Description of Related Art

A conventional operation means of powder grinder is to dispose grains or pieces in a grinder, then the loaded grains or pieces are directly ground into powders with a manual or electric means so as to be sprinkled onto food or soup. The means of freshly grinding grains or pieces for cooking preparation is commonly used.

The mentioned grinder has the basic grinding function. However, the ground powders may stay in the clearance of the grinding unit, supports of the adjustment device or the discharging outlets. As this moment, if the grinder is disposed on a table or a sink, residual ground powders may fall from the grinder thereby contaminating the surface of the table or the sink due to accidental vibrations, and a further cleaning process is inevitable. The applicant of the present invention has invented an improved design entitled "Shut device for a discharger outlet in a grinder" under Taiwan Patent No. 592113 (equivalent to U.S. Pat. No. 6,880,773) for improving the shortage of ground powders scattering. The shut device for a discharge outlet in a grinder utilizes a manual means to rotate a rotary unit for achieving the anticipated discharge control; however, if the user forgets to rotate the rotary unit to an open state, the ground powders would be accumulated around the discharge outlet. As such, the shut device for a discharge outlet still needs to be improved.

In addition, the applicant of the present invention has invented another improved design entitled "Grinder and automatic open/close control device thereof" under Taiwan Patent No. 1333849 (equivalent to U.S. Pat. No. 7,791,874). The aforesaid patent discloses that when the friction generated while the grinding unit grinding the loaded material is greater than the torque of a torsion spring installed in the automatic open/close control device, the automatic open/close control device is forced to rotate, the outlets are automatically opened, and the mentioned torsion spring is in an energy storing state; when the operation is stopped, the torsion spring releases energy and the automatic open/close control device is enabled to reversely rotate thereby automatically closing the outlets. As such, the disclosed patent can improve the convenience when operating a grinder.

When the mentioned grinder is used to grind the loaded grains or pieces, the outlets can be automatically opened so the ground powders can be discharged from the outlets. If the loaded material to be ground contains oil, e.g. sesame, during the grinding process, not only the sesame is ground into powders, oil is also extracted, the condition may result in the ground powders being adhered between the grinding wheel and the grinding base of a grinding unit and between the outlets of bottom cover and the guide slots of follower member of an automatic open/close control device which are correspondingly installed, thus a hygiene issue is caused. Because the bottom cover and the follower member of the automatic open/close control device is integrally combined for enabling a torsion spring to be installed therebetween, and the bottom cover having the outlets is combined with the bottom opening of a housing, so the aforesaid components cannot be individually detached for cleaning the grinding wheel, the grinding base, the follower member and the bottom cover individually, such shortage shall be improved.

SUMMARY OF THE INVENTION

One primary objective of the present invention is to provide a grinder having an automatic open/close control function and capable of detaching components which may have food powders adhered thereon, such as the grinding wheel and the grinding base of a grinding unit and the follower member, the housing and the bottom cover of an automatic open/close control device, so the cleaning operation for ensuring the food hygiene can be easily carried out.

For achieving the aforesaid objective, one technical solution of the present invention is to provide a grinder, which comprises:

a transmission shaft;

a base, having a grinding chamber for accommodating the transmission shaft, the bottom side of the grinding chamber is formed with open spaces;

a grinding unit, including a grinding wheel and a grinding base, the grinding wheel is detachably installed and linked with the transmission shaft, the grinding base is fastened at the bottom side of a receptacle, wherein the grinding wheel penetrates the grinding base thereby forming a gap therebetween;

a hollow receptacle, installed at the top side of the base having its bottom opening detachably installed at the bottom side of the receptacle through an annular coupling flange; and an automatic open/close control device, which further includes:

a follower member, installed at the bottom side of the base, an axle holder formed at the center of the follower member allows the transmission shaft to be connected, the axel holder is adjacent to the circular outer bottom wall and staggeringly installed with at least a stop block and at least a guide slot, the bottom side of the axel holder is formed with a bottom spring hole allowing a torsion spring to be received and positioned, a fasten cover is served to seal the opening of the bottom spring hole, two ends of the torsion spring are respectively fixed in the bottom spring hole and the fasten cover, the central bottom of the fasten cover is protrudingly installed with an inserting rod and longitudinally extended with a combination part;

a housing, serving to house the base, the follower member and the lower portion of the receptacle, a limit mechanism is installed between the inner bottom wall of the housing and the follower member, and additionally formed with a flange allowing the follower member to be provided; and a bottom cover, respectively formed with an inserting hole and outlets corresponding to the inserting rod and the guide slots, an engaging button is combined with the combination part, thereby enabling the bottom cover to be detachably installed at the bottom opening of the housing;

through rotating the housing, the bottom cover, the follower member, the transmission shaft and the grinding wheel are driven to synchronously rotate; the friction generated when the grinding wheel and the grinding base grinding the loaded material is greater than the torque of the torsion spring, through the limit function provided by the limit mechanism, the follower member, relative to the housing, enables the limit mechanism to move from a first end to a second end, so the torsion spring is in an energy storing state, and the outlets are automatically opened relative to the guide slots due to the displacement of the stop blocks.

Another objective of the present invention is to provide an automatic open/close control device of a grinder, wherein the follower member, the housing and the bottom cover of the automatic open/close control device are all detachable for being processed with a cleaning operation, thereby ensuring the food hygiene.

For achieving the aforesaid objective, one technical solution of the present invention is to provide an automatic open/close control device of a grinder, which comprises:

a follower member, pivoted at the bottom side of a grinder, an axle holder formed at the center of the follower member allows a transmission shaft to be connected, the axel holder is adjacent to the circular outer bottom wall and staggeringly installed with at least a stop block and at least a guide slot, the bottom side of the axel holder is formed with a bottom spring hole allowing a torsion spring to be received and positioned, a fasten cover is provided for sealing the opening of the bottom spring hole, two ends of the torsion spring are respectively fixed in the bottom spring hole and the fasten cover, the central bottom of the fasten cover is protrudingly installed with an inserting rod and longitudinally extended with a combination part;

a housing, installed at the outer side of the follower member, a limit mechanism is installed between the inner bottom wall of the housing and the follower member, and additionally formed with a flange allowing the follower member to be provided; and a bottom cover, respectively formed with an inserting hole and outlets corresponding to the inserting rod and the guide slots, an engaging button is combined with the combination part, thereby enabling the bottom cover to be detachably installed at the bottom opening of the housing;

a grinding unit is consisted of a grinding wheel and a grinding base, the friction generated when the grinding wheel and the grinding base grinding the loaded material is greater than the torque of the torsion spring, through the limit function provided by the limit mechanism, the follower member, relative to the housing, enables the limit mechanism to move from a first end to a second end, so the torsion spring is in an energy storing state, and the outlets are automatically opened relative to the guide slots due to the displacement of the stop blocks.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
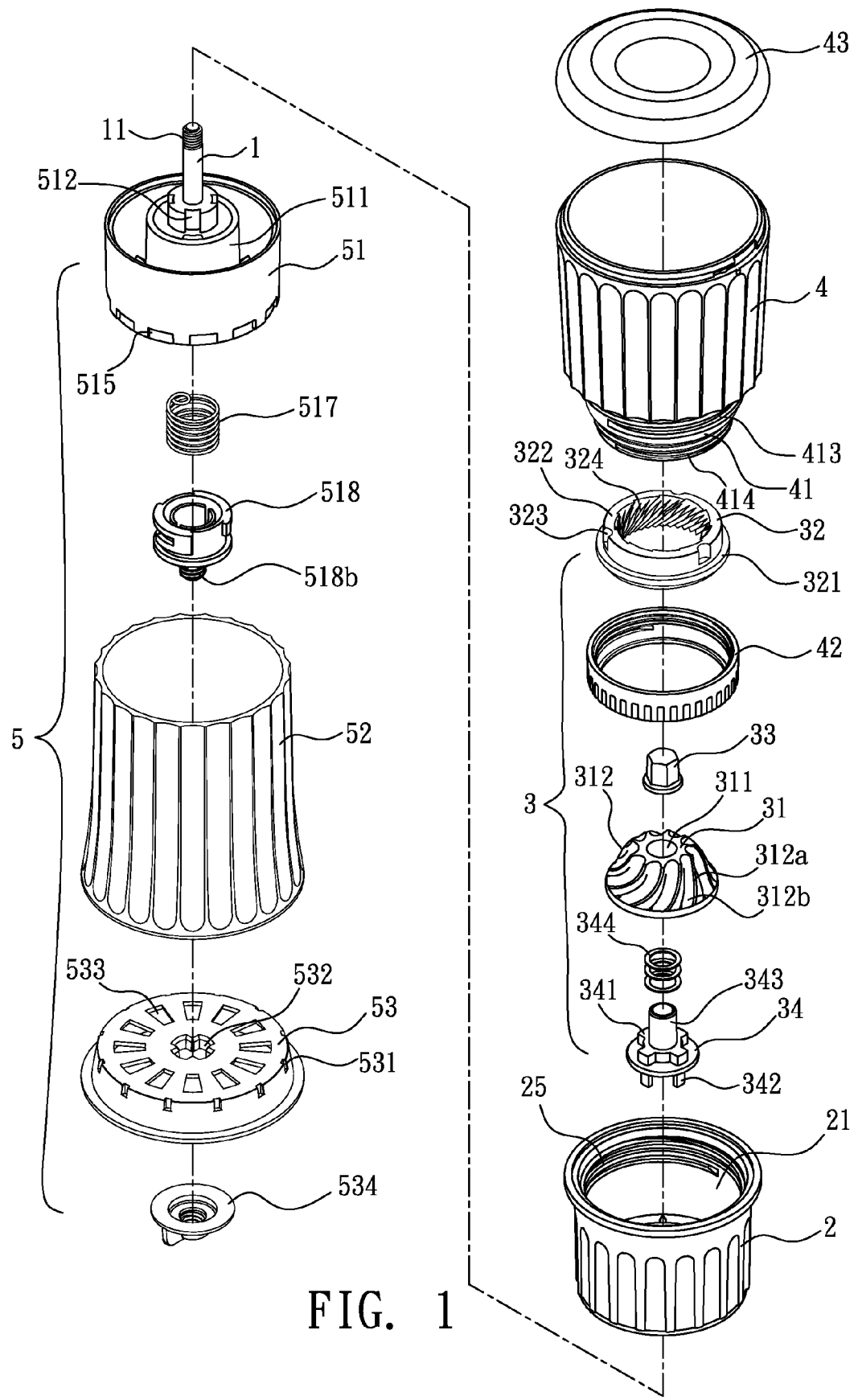
FIG. 1 is a perspective exploded view illustrating the grinder in accordance with the present invention.
Figure 4:
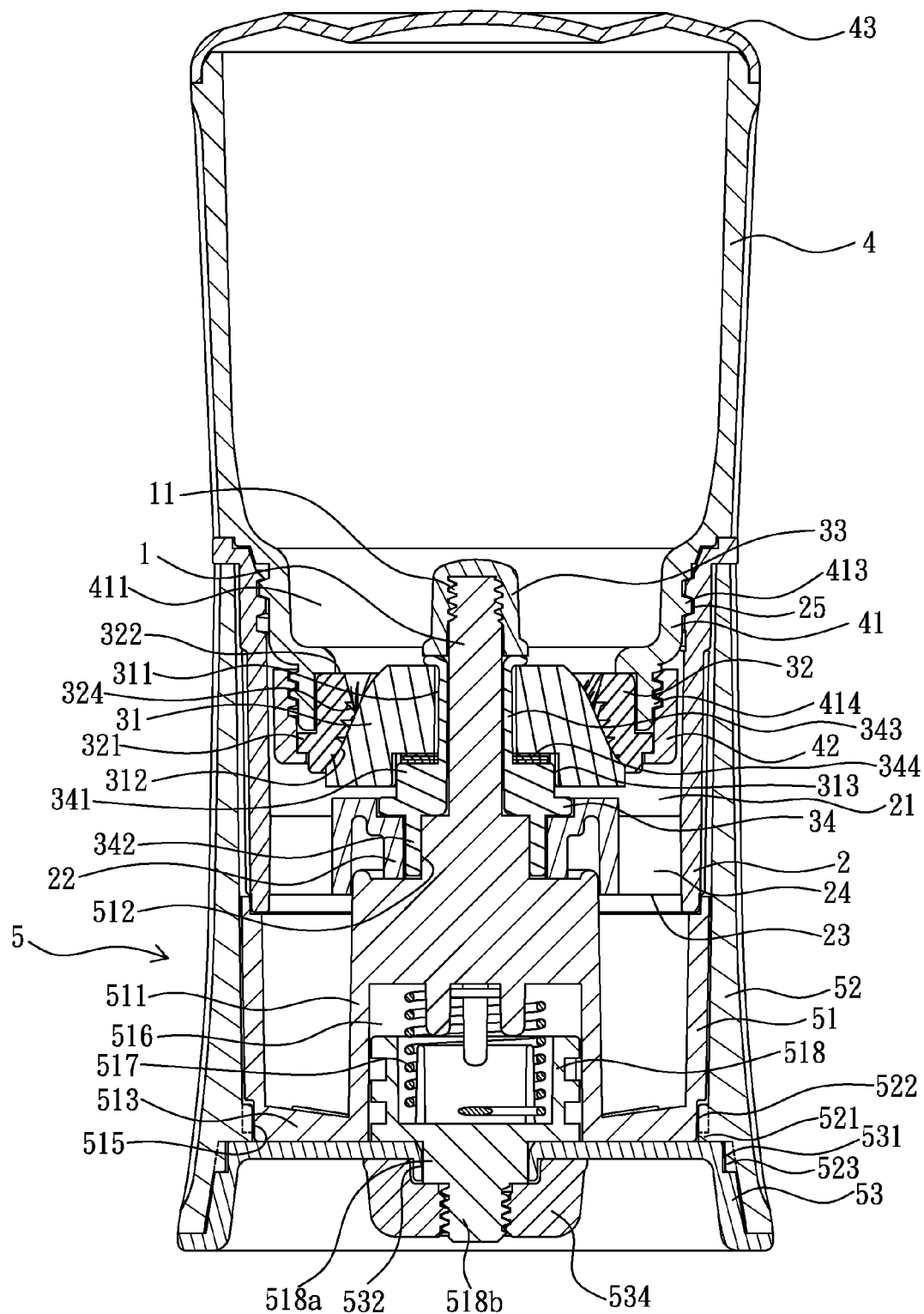
FIG. 4 is a cross sectional view illustrating the assembly of the grinder in accordance with the present invention.

As shown from FIG. 1 and FIG. 4, the grinder provided by the present invention comprises a transmission shaft 1, a base 2, a grinding unit 3, a receptacle 4 and an automatic open/close control device 5.

The transmission shaft 1 is a rod member coupled to a grinding wheel 31 of the grinding unit 3 thereby forming synchronous movement. As shown in FIG. 1, the grinder of the present invention is a manual grinder, and the transmission shaft 1 is longitudinally installed on a follower member 51 of the automatic open/close control device 5. As one alternative of the present invention, the transmission shaft 1 can be extended from a power drive mechanism for driving the grinding wheel 31 to rotate.

Figure 2:
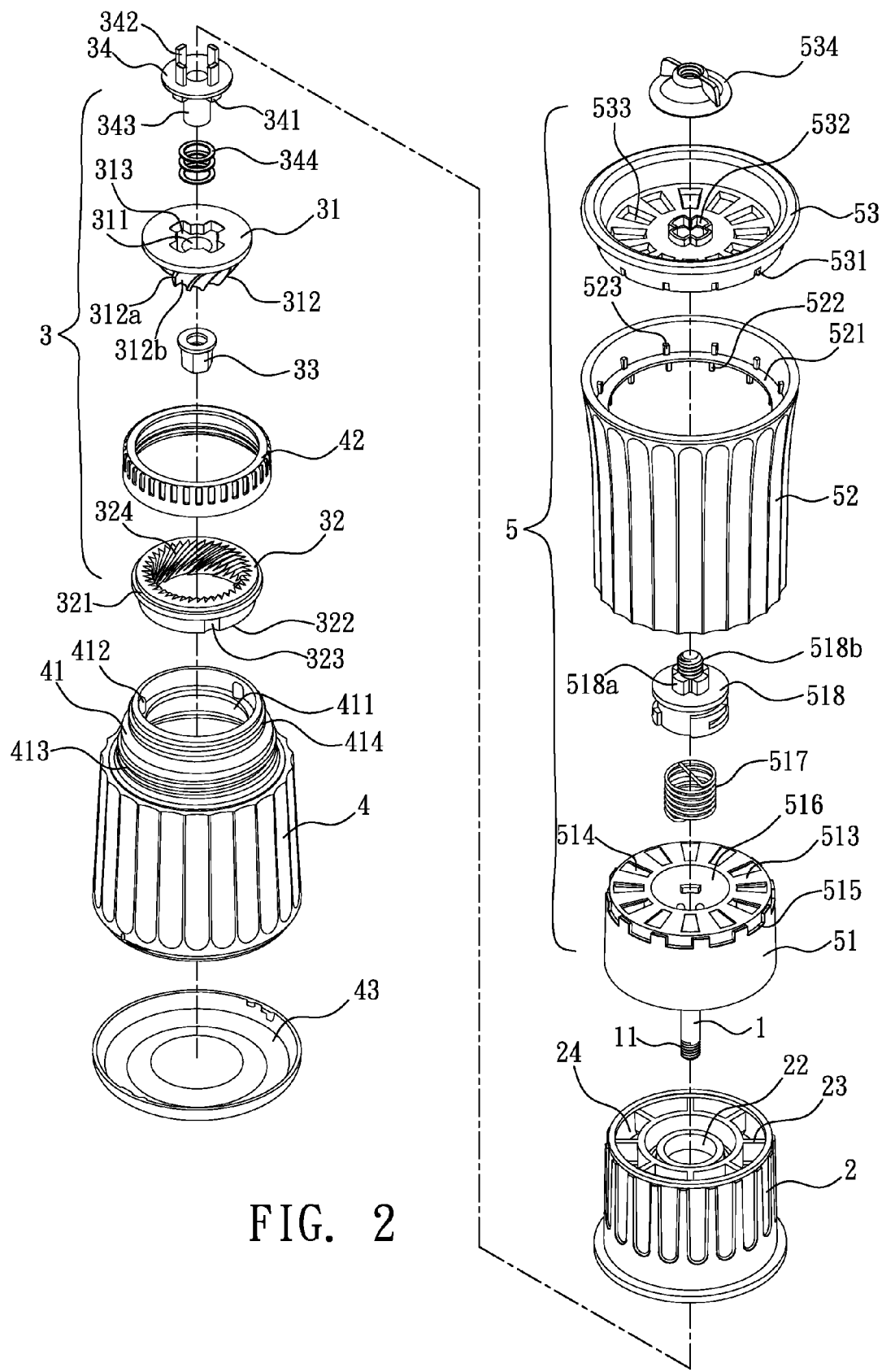
FIG. 2 is another perspective exploded view illustrating the grinder in accordance with the present invention.

The base 2 is a hollow barrel having its bottom side connected to the follower member 51 of the automatic open/close control device 5 and having its top side connected to the receptacle 4. The base 2 is formed with a hollow grinding chamber 21 in which the transmission shaft 1 is inserted from the central bottom side. As shown in FIG. 2, for allowing the base 2 to be linked with the follower member 51, an annular coupling flange 22 is formed at the bottom side of the grinding chamber 21 for being sleeved in an axle holder 511 at the bottom side of the transmission shaft 1. The periphery of the annular coupling flange 22 is formed with plural radial ribs 23 for being connected to the inner bottom wall of the grinding chamber 21, such that the ground powders are enabled to enter the automatic open/close control device 5 through open spaces 24 formed between the radial ribs 23. In addition, The inner top wall of the grinding chamber 21 is formed with at least an inner thread segment 25 for being connected to a first outer thread segment 413 preset on a tubular coupling flange 41 at the bottom side of the receptacle 4.

The grinding unit 3 consists of the aforesaid grinding wheel 31 and a grinding base 32. The grinding wheel 31 is a conical member having a mounting hole 311 allowing the transmission shaft 1 to pass, so a thread segment 11 formed at the upper portion of the transmission shaft 1 can be threaded with a screw cap 33, thus the grinding wheel 31 can be detachably installed on the transmission shaft 1, and can be removed for being processed with a cleaning operation. Wherein, the periphery of the mounting hole 311 is integrally and downwardly extended with sloping teeth 312 having plural spiral wings 312a and spiral grooves 312b.

Referring to FIG. 1 and FIG. 2, for allowing the grinding wheel 31 to be linked with the transmission shaft 1, a top coupling portion 313, e.g. a crossed coupling hole, is concavely formed at the bottom side of the grinding wheel 31, the top coupling portion 313 is mounted to a bottom coupling portion 341, e.g. a crossed coupling block, protrudingly formed at the top side of a link 34. The link 34 is installed on the annular coupling flange 22 at the central bottom side of the base 2, and the bottom side thereof is downwardly and protrudingly formed with plural bottom mounting rods 342 passing the annular coupling flange 22 then being mounted in vertical mounting grooves 512 correspondingly formed on the axle holder 511, thereby enabling the grinding wheel 31 to synchronously rotate with the follower member 51 and the transmission shaft 1.

Wherein, for allowing the grinding wheel 31 to be combined with the link 34 for forming as one piece, the top side of the link 34 is protrudingly formed with a coupling post 343 corresponding to the mounting hole 311. The coupling post 343 is provided with at least a pad 344 used for adjusting the interval defined between the grinding wheel 31 and the grinding base 32, then inserted in the mounting hole 311, a thermal press riveting procedure is processed to the coupling post 343 which protrudes outside the mounting hole 311, thereby combing the grinding wheel 31 and the link 34 as one piece. The transmission shaft 1 passes the coupling post 343, the thread segment 11 formed at the upper portion is threaded with a screw cap 33 thereby preventing the grinding wheel 31 from falling out in the axial direction.

The grinding base 32 is a circular, stepped and hollow member fastened to the bottom side of the receptacle 4. The bottom side of the grinding base 32 has a relatively larger bottom portion 321 on which a top body portion 322 having a relatively smaller diameter is installed. The outer periphery of the top body portion 322 is protrudingly formed with plural positioning grooves 323 thereby being enabled to be mounted and positioned in the receptacle 4. In addition, the periphery of the inner wall of the top body portion 322 is annularly formed with plural oblique grinding teeth 324.

As shown in FIG. 4, when the grinding wheel 31 is disposed in the top body portion 322, an interval is constantly kept therebetween. When rotating the grinding wheel 31, the loaded material, e.g. sesame, is driven by the spiral wings 312a and the spiral grooves 312b of the sloping teeth 312 so as to be ground between the sloping teeth 312 and the grinding teeth 324; the ground powders having different particle sizes are moved along the gap defined between the above two components. Powders having particle diameters smaller than the gap fall out of the grinding unit 3, and others are continuously to be ground thereby obtaining powders having even particle diameters. According to the present invention, the grinding wheel 31 and the grinding base 32 are preferably made of acid-proof, wearing proof, anti-oxidation precision ceramics, preventing deterioration of the loaded material to be ground.

The receptacle 4 is installed on the base 2, and preferably formed as a hollow transparent member, so the amount of loaded material to be ground can be conveniently observed. The bottom side of the receptacle 4 is extended with the aforesaid stepped tubular coupling flange 41 having an opening 411 at the center. The tubular coupling flange 41 allows the grinding base 32 to be installed thereon, and the periphery of the inner wall thereof is respectively formed with positioning ribs 412 corresponding to the locations of the positioning grooves 323, such that a combination flange 42 is enabled to be combined on a second outer thread segment 414 at the bottom side of the tubular coupling flange 41, thereby enabling the grinding base 32 to be stably fastened at the bottom side of the tubular coupling flange 41 and to be detachably installed on the tubular coupling flange 41 at the bottom side of the receptacle 4. After removing the combination flange 42, the grinding base 32 can be processed with a cleaning operation. Furthermore, in order to seal the receptacle 4, the open top of the receptacle 4 is provided with a top cover 43 thereby being sealed.

The automatic open/close control device 5 consists of the aforesaid follower member 51, a housing 52 and a bottom cover 53. The center of the follower member 51 is installed with an axle holder 511 allowing the transmission shaft 1 to longitudinally extend, the top side of the axle holder 511 is formed with the aforesaid vertical mounting grooves 512 thereby allowing the bottom mounting rods 342 correspondingly installed on the link 34 to pass the annular coupling flange 22 then be mounted in the vertical mounting grooves 512. Plural sector-like stop blocks 513 are annularly formed between the bottom side and the circular outer bottom wall of the axle holder 511 and arranged with a radial manner at equal angles, thereby respectively defining a sector-like guide slot 514 between two adjacent stop blocks 513, so the stop blocks 513 and the guide slots 514 are staggeringly arranged. The outer bottom wall of the follower member 51 is installed with a limit mechanism, e.g. at least a limit groove 515. As shown in FIG. 1 and FIG. 2, the limit mechanism installed at the outer bottom wall of the follower member 51 is formed with plural limit grooves 515 annularly spaced at equal intervals. The bottom side of the axel holder 511 is further formed with a bottom spring hole 516 in which a torsion spring 517 is received and positioned, an opening of the bottom spring hole 516 is sealed by a fasten cover 518, and two ends of the torsion spring 517 are respectively fixed in the bottom spring hole 516 and the fasten cover 518, and the aforesaid torsion spring 517 is equipped with an energy storing/releasing function. The central bottom side of the fasten cover 518 is protrudingly installed with an inserting rod 518a, e.g. a crossed protruding rod, and longitudinally extended with a combination part 518b, e.g. a screw rod.

The housing 52 is served to house the base 2, the follower member 51 and the lower portion of the receptacle 4. When the grinder being used, a user holds the housing 52 with one hand for rotating, and holds the receptacle 4 with the other hand for fixing, thereby enabling the follower member 51, the transmission shaft 1 and the grinding wheel 31 to synchronously rotate with the housing 52. Wherein, the inner bottom wall of the housing 52 is formed with an annular flange 521 allowing the follower member 51 to be provided, the top and the bottom sides thereof are respectively installed with at least a stop rod 522 and at least a positioning rod 523. As shown in FIG. 2, the top and the bottom sides of the annular flange 521 are respectively installed with the stop rods 522 and the positioning rods 523 annularly arranged at equal intervals and having the quantity corresponding to the limit grooves 515. Wherein, each stop rod 522 of the limit mechanism is inserted in the limit groove 515 correspondingly formed at the bottom side of the follower member 51.

The periphery of the bottom cover 53 is formed with positioning slots 531 capable of receiving the positioning rods 523, thereby enabling the bottom cover 53 to synchronously rotate with the housing 52. The bottom cover 53 is formed with an inserting hole 532 and sector-like outlets 533 corresponding to the inserting rod 518a and the guide slots 514. After the inserting rod 518a inserted in the inserting hole 532, an engaging button 534 is combined with the combination part 518b, e.g. a screwing manner, such that the bottom cover 53 is enabled to be detachably installed at the bottom opening of the housing 52 for being processed with a cleaning operation. When the grinder not being used, the stop blocks 513 are served to seal the outlets 533.

Figure 3:
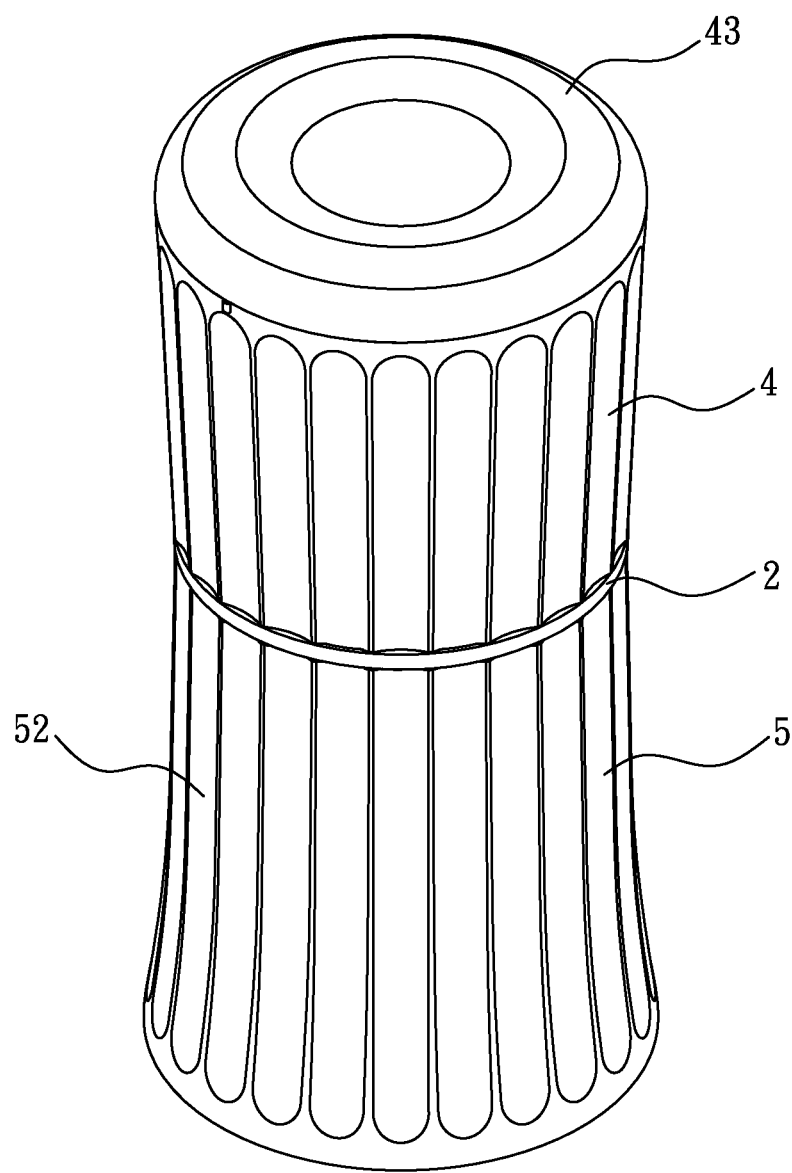
FIG. 3 is a perspective view illustrating the assembly of the grinder in accordance with the present invention.

With the illustration of each component and the assembling means provided above, FIG. 3 is a perspective view and FIG. 4 is a cross sectional view showing the assembly of the grinder in accordance with the present invention.

Figure 5:
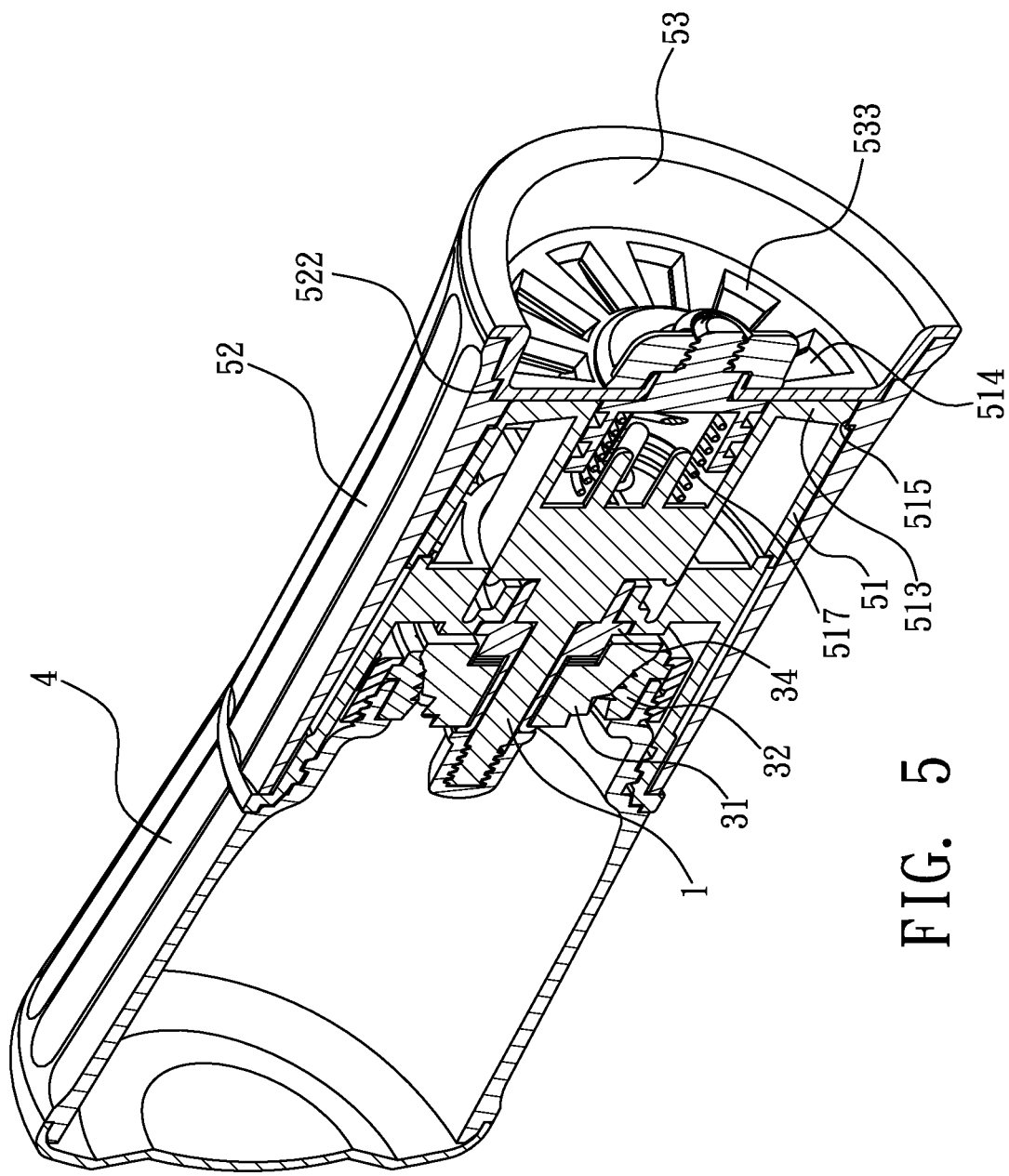
FIG. 5 is a schematic view illustrating the automatic open/close control device being in an open state during the grinding operation in accordance with the present invention.

Referring to FIG. 5, when the grinder being used, the user holds the receptacle 4 with one hand and rotates the housing 52 with the other hand, so the bottom cover 53 drives the follower member 51 to rotate, and the transmission shaft 1 linked with the follower member 51 and the connected link 34 drive the grinding wheel 31 to rotate. When the friction produced by the loaded material, e.g. sesame, ground between the grinding wheel 31 and the grinding base 32 is greater than the torque of the torsion spring 517, the follower member 51 rotates with the bottom cover 53 thereby allowing the torsion spring 517, installed therebetween, to store energy; during the rotation, second ends of the limit grooves 515 are abutted against the stop rods 522, and each stop block 513 rotates with the follower member 51, so each guide slot 514 is aligned with the outlet 533 and allows the ground sesame powders having even dimensions to pass and be discharged from the outlets 533, thereby achieving the objective of automatic open/close control.

Figure 6:
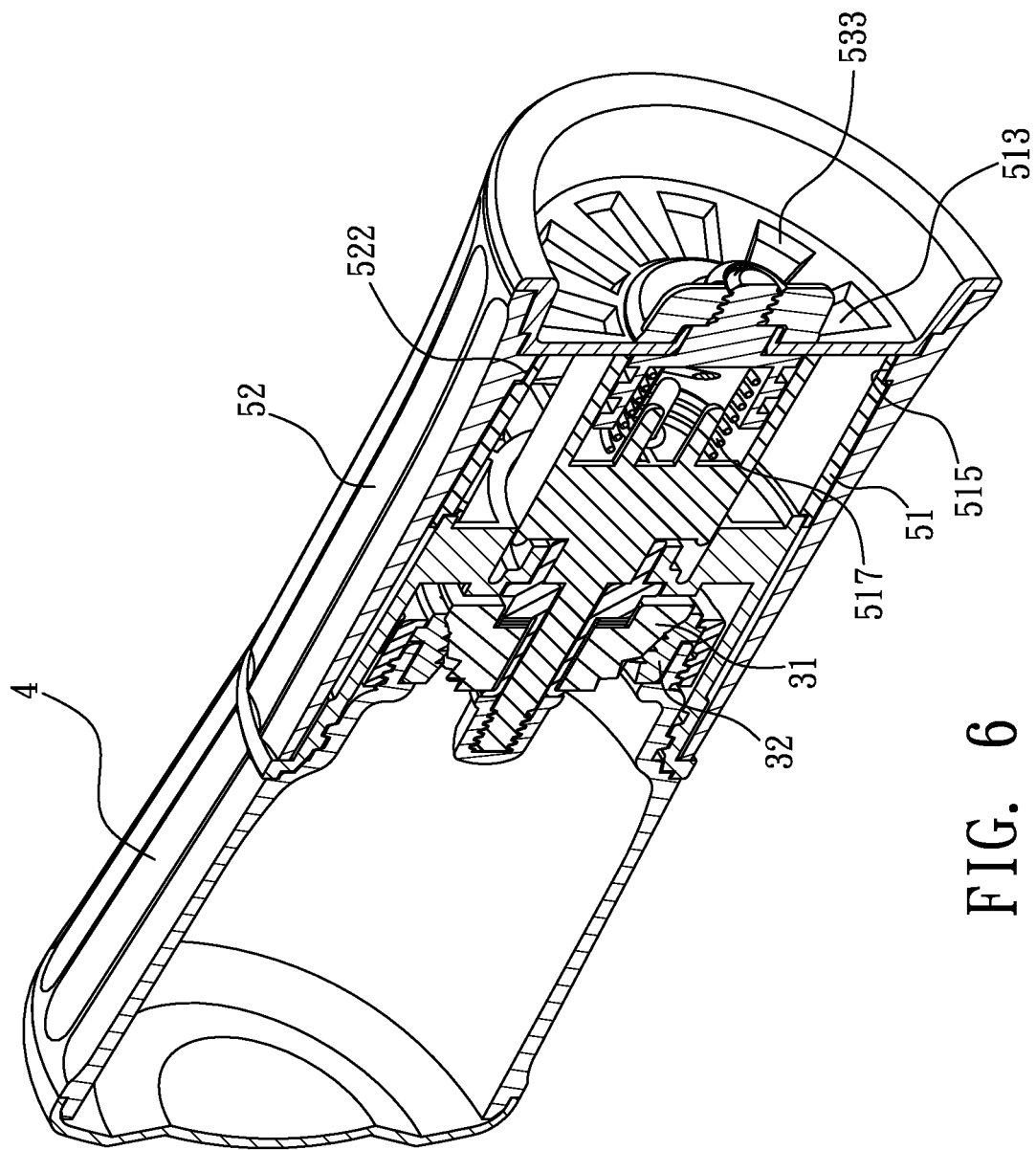
FIG. 6 is a schematic view illustrating the automatic open/close control device being in a close state when the grinding operation being stopped in accordance with the present invention.

Referring to FIG. 6, when the rotation of the housing 52 is stopped, the follower member 51 reversely rotates through the torsion spring 517 releasing energy, so during the reverse rotation of the limit grooves 515, first ends thereof are abutted against the stop rods 522, so the stop blocks 513 are moved to the outlets 533 thereby sealing the outlets 533. In addition, when the loaded material, e.g. sesame, disposed between the grinding wheel 31 and the grinding base 32 has been run out, i.e. the friction between the loaded material and the grinding unit is smaller than the torque of the torsion spring 517, thereby causing the follower member 51 idly rotating and the stop blocks 513 blocking the outlets 533.

The technical characteristic of the present invention is that the grinding wheel and the grinding base of the grinding unit can be detachably and respectively installed on the transmission shaft and the bottom side of the receptacle, and the bottom cover of the automatic open/close control device utilizes the engaging button to be combined with the combination part of the fasten cover at the bottom side of the follower member, thereby allowing the bottom cover to be detachably installed at the bottom opening of the housing. As such, components which may have food powders adhered thereon, e.g. the grinding wheel and the grinding base of the grinding unit and the follower member, the housing and the bottom cover of the automatic open/close control device can all be detached, so the cleaning operation for ensuring the food hygiene can be easily carried out.

Moreover, while the grinder being used, through the friction generated between the grinding unit and the loaded material, e.g. sesame, during the grinding process being greater than the torque of the torsion spring installed in the automatic open/close control device, the automatic open/close control device is enabled to rotate and automatically open the outlets and the torsion spring inside the device is in an energy storing state; when the operation of the grinder being stopped, the torsion spring releases the energy and the automatic open/close control device is forced to reversely rotate thereby automatically blocking the outlets.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A grinder, comprising:
   a transmission shaft;
   a base, having a grinding chamber for accommodating said transmission shaft, the bottom side of said grinding chamber is formed with open spaces;
   a grinding unit, including a grinding wheel and a grinding base, said grinding wheel being detachably installed and linked with said transmission shaft, said grinding base being fastened at the bottom side of a receptacle, wherein said grinding wheel penetrating said grinding base thereby forming a gap therebetween;
   the receptacle, being hollow and installed on said base having its bottom opening detachably installed at the bottom side of said receptacle through an annular coupling flange; and
   an automatic open/close control device, including:
   a follower member, installed at the bottom side of said base, an axle holder formed at the center of said follower member allowing said transmission shaft to be connected, said axel holder being adjacent to the circular outer bottom wall and staggeringly installed with at least a stop block and at least a guide slot, the bottom side of said axel holder is formed with a bottom spring hole allowing a torsion spring to be received and positioned, a fasten cover being provided for sealing the opening of said bottom spring hole, two ends of said torsion spring being respectively fixed in said bottom spring hole and said fasten cover, the central bottom of said fasten cover being protrudingly installed with an inserting rod and longitudinally extended with a combination part;
   a housing, serving to house said base, said follower member and the lower portion of said receptacle, a limit mechanism being installed between the inner bottom wall of said housing and said follower member, and additionally formed with a flange allowing said follower member to be provided; and
   a bottom cover, respectively formed with an inserting hole and outlets corresponding to said inserting rod and said guide slots, an engaging button being combined with said combination part, thereby enabling said bottom cover to be detachably installed at the bottom opening of said housing;
   wherein, when rotating said housing, said bottom cover, said follower member, said transmission shaft and said grinding wheel being driven to synchronously rotate; the friction generated when said grinding wheel and said grinding base grinding the loaded material being greater than the torque of said torsion spring, through the limit function provided by said limit mechanism, said follower member, relative to said housing, enabling said limit mechanism to move from a first end to a second end, so said torsion spring being in an energy storing state, and said outlets being automatically opened relative to said guide slots due to the displacement of said stop blocks.

2. The grinder as claimed in claim 1, wherein said limit mechanism between said housing and said follower member is composed of at least a limit groove and at least a stop rod formed at adjacent locations of said housing and said follower member, wherein each stop rod is abutted against a first end of said limit groove while being in a non-operation state, so each stop block of said follower member blocks said outlet correspondingly formed; when said follower member is rotated, each stop rod is abutted against a second end of said limit groove, so said stop block is displaced and said guide slot is aligned with said outlet.

3. The grinder as claimed in claim 1, wherein a link is further installed between said grinding wheel and said axle holder, said link allows said transmission shaft to pass and is installed on said annular coupling flange formed at the central bottom of said base, the top side of said link is protrudingly formed with a bottom coupling portion, said bottom coupling portion is mounted in a top coupling portion correspondingly formed at the bottom side of said grinding wheel, the bottom side of said link is protrudingly formed with plural bottom mounting rods mounted in vertical mounting grooves correspondingly formed at the periphery of said axle holder.

4. The grinder as claimed in claim 3, wherein the top side of said link is protrudingly formed with a coupling post penetrating and exposing out of the top side of said grinding wheel, the top side of said coupling post is processed with a thermal press riveting procedure thereby combining said grinding wheel and said link as one piece; and said transmission shaft passes said coupling post, and a thread segment at the upper portion thereof is threaded with a screw cap.

5. The grinder as claimed in claim 4, wherein said coupling post is provided with at least a pad used for adjusting the interval between said grinding wheel and said grinding base.

6. The grinder as claimed in claim 1, wherein the inner bottom wall of said housing is installed with at least a positioning rod, and the periphery of said bottom cover is formed with a positioning slot capable of receiving said positioning rod, thereby enabling said bottom cover to synchronously rotate with said housing.

7. A grinder, comprising:
a transmission shaft;
a grinding unit having a grinding wheel and a grinding base;
a follower member, pivoted at the bottom side of a grinder, an axle holder formed at the center of said follower member allowing the transmission shaft to be connected, said axel holder being adjacent to the circular outer bottom wall and staggeringly installed with at least a stop block and at least a guide slot, the bottom side of said axel holder being formed with a bottom spring hole allowing a torsion spring to be received and positioned, a fasten cover being provided for sealing the opening of said bottom spring hole, two ends of said torsion spring being respectively fixed in said bottom spring hole and said fasten cover, the central bottom of said fasten cover being protrudingly installed with an inserting rod and longitudinally extended with a combination part;
a housing, installed at the outer side of said follower member, a limit mechanism being installed between the inner bottom wall of said housing and said follower member, and additionally formed with a flange allowing said follower member to be provided; and
a bottom cover, respectively formed with an inserting hole and outlets corresponding to said inserting rod and said guide slots, an engaging button being combined with said combination part, thereby enabling said bottom cover to be detachably installed at the bottom opening of said housing;
when the friction generated by the grinding unit, grinding the loaded material being greater than the torque of said torsion spring, through the limit function provided by said limit mechanism, said follower member, relative to said housing, enables said limit mechanism to move from a first end to a second end, so said torsion spring being in an energy storing state, and said outlets being automatically opened relative to said guide slots due to the displacement of said stop blocks.

8. The grinder as claimed in claim 7, wherein said limit mechanism between said housing and said follower member is composed of at least a limit groove and at least a stop rod formed at adjacent locations of said housing and said follower member, wherein each stop rod is abutted against a first end of said limit groove while being in a non-operation state, so each stop block of said follower member blocks said outlet correspondingly formed; when said follower member is rotated, each stop rod is abutted against a second end of said limit groove, so said stop block is displaced and said guide slot is aligned with said outlet.

9. The grinder as claimed in claim 7, wherein a link is further installed between said grinding wheel and said axle holder, said link allows said transmission shaft to pass and is installed on said annular coupling flange formed at the central bottom of a base, the top side of said link is protrudingly formed with a bottom coupling portion, said bottom coupling portion is mounted in a top coupling portion correspondingly formed at the bottom side of said grinding wheel, the bottom side of said link is protrudingly formed with plural bottom mounting rods mounted in vertical mounting grooves correspondingly formed at the periphery of said axle holder.

10. The grinder as claimed in claim 9, wherein the top side of said link is protrudingly formed with a coupling post penetrating and exposing out of the top side of said grinding wheel, the top side of said coupling post is processed with a thermal press riveting procedure thereby combining said grinding wheel and said link as one piece; and said transmission shaft passes said coupling post, and a thread segment at the upper portion thereof is threaded with a screw cap.

11. The grinder as claimed in claim 10, wherein said coupling post is provided with at least a pad used for adjusting the interval between said grinding wheel and said grinding base.

12. The grinder as claimed in claim 7, wherein the inner bottom wall of said housing is installed with at least a positioning rod, and the periphery of said bottom cover is formed with a positioning slot capable of receiving said positioning rod, thereby enabling said bottom cover to synchronously rotate with said housing.

* * * * *